UNITED STATES PATENT OFFICE.

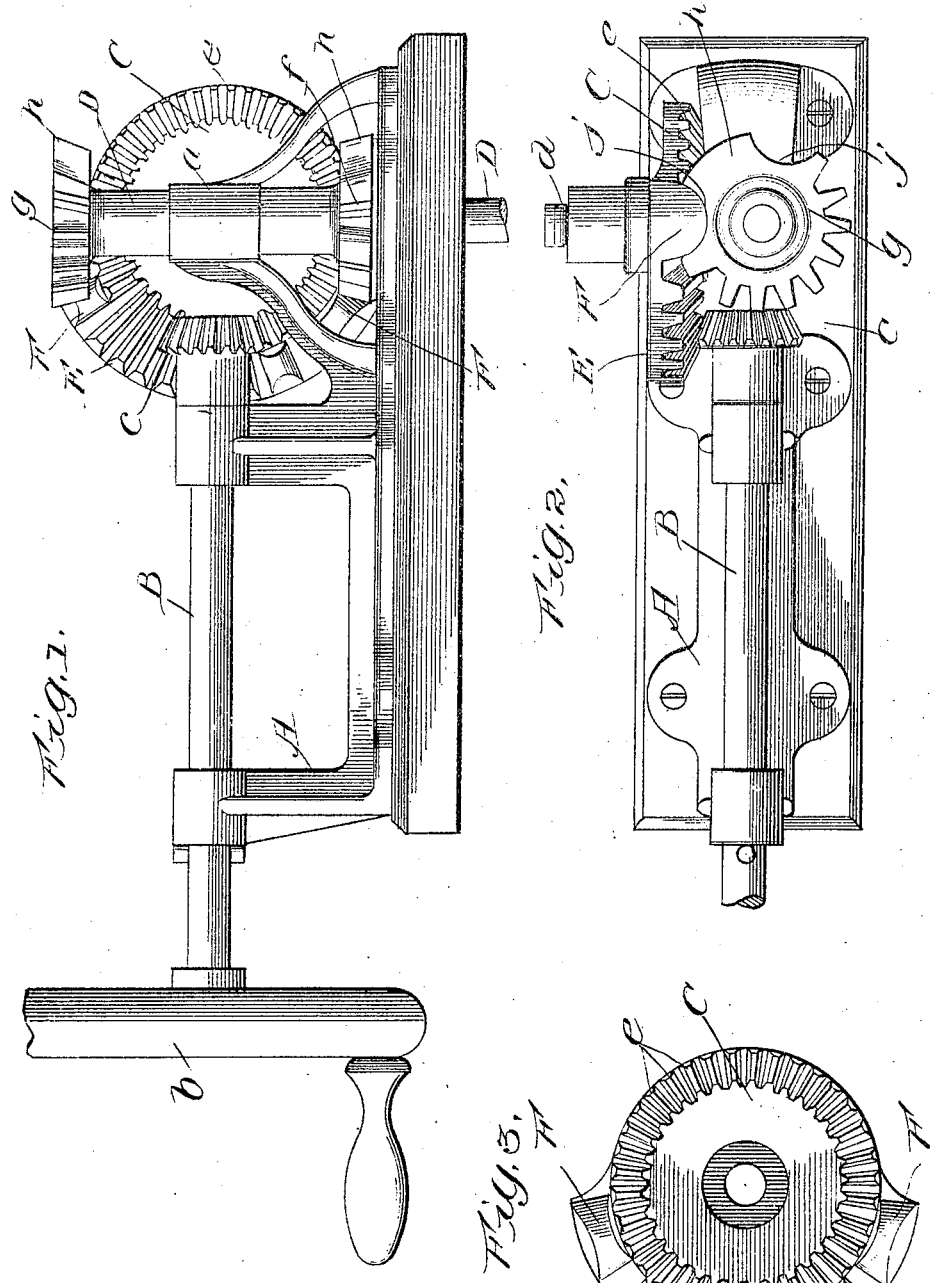

HENRY BRAMMER, OF ST. LOUIS, MISSOURI, ASSIGNOR OF ONE-FOURTH TO FRANK D. THOMASON, OF CHICAGO, ILLINOIS.

MECHANICAL MOVEMENT.

No. 798,492.     Specification of Letters Patent.     Patented Aug. 29, 1905.

Application filed May 8, 1905. Serial No. 259,356.

*To all whom it may concern:*

Be it known that I, HENRY BRAMMER, a citizen of the United States, and a resident of St. Louis, in the State of Missouri, have invented certain new and useful Improvements in Mechanical Movements, of which the following is a full, clear, and exact description.

My invention relates to mechanical movements, and especially movements adapted to be used in washing-machines, churns, &c.; and its object is to convert a continuous rotary motion into a rotary reciprocal motion by simple, effective, and economically-constructed means, substantially as hereinafter fully described and as particularly pointed out in the claims.

In the drawings, Figure 1 is a side elevation of my invention. Fig. 2 is a plan view thereof. Fig. 3 is a detail view of the idle-gear used to transmit motion from the continuously-revolving shaft to the rotary reciprocal shaft.

In the drawings, A represents a supporting-frame of my improved movement, and it comprises uprights or standards having bearings in their upper ends for the drive-shaft B, and bearings $a$, which are supported by legs which are preferably arranged opposite each other in the same plane as the bearings of the drive-shaft and straddle the lower mutilated segmental pinion $f$ on the rotary reciprocal shaft D, journaled in bearings $a$. The drive-shaft is provided with a hand-operated fly-wheel $b$ on its outer end or with other suitable means to rotate it continuously in one direction, and at its opposite end, adjacent to the shaft D, it is provided with a pinion $c$, which engages an idle gear C. This idle gear C has its axis arranged at right angles to the axis of the shaft D and is journaled on a stud $d$, projecting laterally from the bearings $a$ of the supporting-frame, substantially as shown. This idle gear C is provided with a continuous series of inner bevel-gear teeth $e$, with which the pinion $c$ has uninterrupted engagement. A portion of these teeth $e$ are extended beyond the outer periphery of these teeth to form a central portion of a segmental gear E, which latter is of greater radius than said gear C and preferably is of a length corresponding to about two-fifths of the perimeter described thereby, although, if desired, the length of this segmental gear may be made greater or less, according as desired, without departing from the spirit of my invention. The ends of this segmental gear E terminate in two enlarged teeth F, those constituting the end teeth corresponding in width at their bases to almost three of the teeth $e$ and projecting from the back of the gear almost twice the distance that teeth $e$ do, and the curvature of the engaging surface of these teeth is preferably semicircular. The space between the enlarged end teeth F and the enlarged teeth G, located between the same and those teeth of the central portion of the segment E made by extending the teeth $e$, is wider than between the other teeth of the segment, and the width of the teeth G and the extent of their projections from the back of the gear is greater than that of teeth $e$ and preferably less than that of teeth F. As this gear C revolves the segment E thereof engages first the segmental pinion $f$, mounted on shaft D, located between the legs of the bearings $a$, as hereinbefore stated, and a similar segmental mutilated pinion $g$, secured to said shaft above its bearings $a$.

Each end of the mutilated segmental pinions $f$ and $g$ terminates in an enlarged tooth $h\ h$, the proportions of which practically correspond to those of teeth G of the transmission-segment E, and the space between these teeth $h$ and the remaining teeth of the pinion is both wider and deeper than the space between said remaining teeth to accommodate the engagement therewith of said teeth G. The space $j$ between the teeth $h$ and the ends of the segmental pinions is enlarged, so as to accommodate the engagement with the pinion of the enlarged end teeth F of the transmission-segment.

In operation the drive-pinion $c$ of the drive-shaft B engages and revolves the idle gear C continuously in one direction. The segmental gear E, carried by the idle gear C, engages first one of the mutilated pinions on the rotary reciprocal shaft D while traveling in one direction and immediately upon passing out of engagement therewith engages at a diametrically opposite point, consequently moving in the opposite direction the other of said mutilated pinions, and thus causes the shaft D to rotate first in one direction and then in the opposite direction. The object of the enlarged teeth at the ends of the segmental gear E, carried by the idle gear C at the ends of the segments of pinions $f$ and $g$, is to insure the alternate engagement of said gear and pinions without incurring the danger of the gear-teeth having a crown-to-crown engagement and crushing each other. Besides this advantage the making of the end teeth F of the segmental gear E semicircular by reason of its presenting no edges or other surfaces enables it to slip into engagement with the pinions *f* and *g* even though there should be a slight displacement of said pinions on shaft D from their proper relative positions, as is likely to be caused during the manufacture thereof either by reason of poor castings or careless assembling of the parts together. While I much prefer the use of these enlarged teeth, however, I do not wish to be confined to the exact construction thereof or even to the presence of the same in the movement, as the combination of the idle gear C with the segmental gear carried thereby is entirely new in a movement of this character.

What I claim as new is—

1. A mechanical movement comprising a continuously-revolving drive-shaft, a continuously-revolving idle gear actuated thereby, the axis of which is at an angle to the axis of said drive-shaft, a segmental gear carried by said idle gear, a rotary reciprocal shaft the axis of which is at an angle to that of said drive-shaft, and segmental pinions secured fast on said rotary reciprocal shaft and alternately engaged by said segmental gear at points diametrically opposite each other.

2. A mechanical movement comprising a continuously-revolving drive-shaft, a continuously-revolving idle gear actuated thereby, a segmental gear carried by said idle gear the end teeth of which are larger than the remainder of the teeth thereof, a rotary reciprocal shaft the axis of which is at an angle to that of said drive-shaft, and segmental pinions secured fast on said rotary reciprocal shaft and alternately engaged by said segmental gear at points diametrically opposite each other.

3. A mechanical movement comprising a continuously-revolving drive-shaft, a continuously-revolving idle gear actuated thereby, a segmental gear carried by said idle gear the end teeth of which are larger than the remainder of the teeth thereof and have their engaging surfaces rounded, a rotary reciprocal shaft the axis of which is at an angle to that of said drive-shaft, and segmental pinions secured fast on said rotary reciprocal shaft and alternately engaged by said segmental gear at points diametrically opposite each other.

4. A mechanical movement comprising a continuously-revolving drive-shaft, a continuously-revolving idle gear actuated thereby, a segmental gear carried by said idle gear the last two teeth at each end of which are larger than the remainder of the teeth thereof, a rotary reciprocal shaft the axis of which is at an angle to that of said drive-shaft, and segmental pinions secured fast on said rotary reciprocal shaft and alternately engaged by said segmental gear at points diametrically opposite each other.

5. A mechanical movement comprising a continuously-revolving drive-shaft, a continuously-revolving idle gear actuated thereby, a segmental gear carried by said idle gear the last two teeth at each end of which are larger than the remainder of the teeth thereof and the end one of these last two teeth being larger than the other, a rotary reciprocal shaft the axis of which is at an angle to that of said drive-shaft, and segmental pinions secured fast on said rotary reciprocal shaft and alternately engaged by said segmental gear at points diametrically opposite each other.

In testimony whereof I have hereunto set my hand this 3d day of March, A. D. 1905.

HENRY BRAMMER.

Witnesses:
 FRANK D. THOMASON,
 E. K. LUNDY.